United States Patent
Campbell et al.

(10) Patent No.: US 10,775,940 B2
(45) Date of Patent: Sep. 15, 2020

(54) FORCE-SENSITIVE ELECTRONIC DEVICE

(71) Applicant: NextInput, Inc., San Jose, CA (US)

(72) Inventors: Ian Campbell, San Jose, CA (US); Ryan Diestelhorst, Sunnyvale, CA (US)

(73) Assignee: NextInput, Inc., San Jose, CA (US)

( * ) Notice: Subject to any disclaimer, the term of this patent is extended or adjusted under 35 U.S.C. 154(b) by 283 days.

(21) Appl. No.: 15/492,127

(22) Filed: Apr. 20, 2017

(65) Prior Publication Data

US 2017/0308197 A1    Oct. 26, 2017

Related U.S. Application Data

(60) Provisional application No. 62/325,119, filed on Apr. 20, 2016.

(51) Int. Cl.
*G06F 3/044* (2006.01)
*G06F 3/041* (2006.01)

(52) U.S. Cl.
CPC ............ *G06F 3/044* (2013.01); *G06F 3/0414* (2013.01); *G06F 3/0418* (2013.01); *G06F 2203/04105* (2013.01)

(58) Field of Classification Search
None
See application file for complete search history.

(56) References Cited

U.S. PATENT DOCUMENTS

| | | |
|---|---|---|
| 2002/0180710 A1 | 12/2002 | Roberts |
| 2004/0227736 A1 | 11/2004 | Kamrath et al. |
| 2011/0175845 A1* | 7/2011 | Honda ............... G06F 3/0414 345/174 |
| 2012/0316797 A1* | 12/2012 | Ratzlaff ............ A01K 1/031 702/41 |
| 2013/0342501 A1* | 12/2013 | Molne .................. G06F 3/045 345/174 |
| 2014/0062934 A1 | 3/2014 | Coulson et al. |
| 2014/0118270 A1* | 5/2014 | Moses ................. G06F 3/041 345/173 |
| 2015/0116233 A1* | 4/2015 | Kono .................. G06F 3/041 345/173 |

(Continued)

FOREIGN PATENT DOCUMENTS

| | | |
|---|---|---|
| WO | WO 2012/160844 A1 | 11/2012 |
| WO | WO 2015/019533 A1 | 2/2015 |

OTHER PUBLICATIONS

International Search Report and Written Opinion issued in related International Application No. PCT/US2017/028510 dated Aug. 29, 2017.

(Continued)

*Primary Examiner* — Patrick N Edouard
*Assistant Examiner* — Peijie Shen
(74) *Attorney, Agent, or Firm* — Meunier Carlin & Curfman LLC (57) ABSTRACT

An example force-sensitive electronic device is described herein. The device can include a device body, a touch surface bonded to the device body in a bonded region that is arranged along a peripheral edge of the touch surface, and a plurality of force sensors that are arranged between the device body and the touch surface. Each of the plurality of force sensors can be spaced apart from the bonded region.

11 Claims, 10 Drawing Sheets

(56) References Cited

U.S. PATENT DOCUMENTS

| | | | |
|---|---|---|---|
| 2015/0234533 A1 | 8/2015 | Aberg et al. | |
| 2015/0370376 A1* | 12/2015 | Harley | G06F 3/0414 |
| | | | 345/174 |
| 2016/0070415 A1* | 3/2016 | Christiansson | G06F 3/0421 |
| | | | 345/175 |
| 2016/0103544 A1* | 4/2016 | Filiz | G06F 3/0412 |
| | | | 345/174 |
| 2016/0328065 A1* | 11/2016 | Johnson | G06F 3/044 |
| 2017/0038905 A1* | 2/2017 | Bijamov | G06F 3/0414 |
| 2017/0060326 A1* | 3/2017 | Kim | G06F 3/0416 |
| 2017/0075489 A1* | 3/2017 | Jaaskela | G06F 3/044 |
| 2017/0131840 A1* | 5/2017 | Deichmann | G06F 3/044 |
| 2017/0205937 A1* | 7/2017 | Zhang | G06F 3/0488 |
| 2017/0357346 A1* | 12/2017 | Wang | G06F 3/0414 |
| 2017/0357352 A1* | 12/2017 | Yang | G06F 3/044 |
| 2018/0088721 A1* | 3/2018 | Moon | G06F 3/0414 |
| 2018/0150179 A1* | 5/2018 | Moon | G06F 3/0418 |
| 2018/0328799 A1* | 11/2018 | Park | G06F 3/044 |

OTHER PUBLICATIONS

Barrett, G., et al., Projected-capacitive touch technology, Information Display, 26(3), 2010 (6 pages).

Supplementary European Search Report, issued in corresponding application No. EP 17 78 6605, dated Oct. 24, 2019, 31 pages.

\* cited by examiner

FORCE-SENSITIVE ELECTRONIC DEVICE

CROSS-REFERENCE TO RELATED APPLICATIONS

This application claims the benefit of U.S. provisional patent application No. 62/325,119, filed on Apr. 20, 2016, and entitled "FORCE-SENSITIVE ELECTRONIC DEVICE," the disclosure of which is expressly incorporated herein by reference in its entirety.

BACKGROUND

Touch-sensitive interfaces have been widely employed in electronic devices, particularly in consumer electronic devices. A variety of touch-sensitive technologies, including resistive, capacitive, surface acoustic wave, optical, etc., are known in the art. These touch-sensitive technologies can be used to sense when and where an operator makes contact with the touch-sensitive interface. This information can be used to control operations of the consumer electronic devices. The addition of force-sensitivity to a touch-sensitive device can add additional control dimensions that can be very useful, but mechanical integration can be challenging.

SUMMARY

Mechanical integration of force sensors into a force-sensitive or touch-sensitive device is described herein.

An example force-sensitive electronic device is described herein. The device can include a device body, a touch surface bonded to the device body in a bonded region that is arranged along a peripheral edge of the touch surface, and a plurality of force sensors that are arranged between the device body and the touch surface. Each of the plurality of force sensors can be spaced apart from the bonded region.

Additionally, the plurality of force sensors can optionally be at least two force sensors, where the at least two force sensors are arranged in a first direction with about equal spacing between each of the at least two force sensor and a respective peripheral edge of the touch surface.

Alternatively or additionally, the plurality of force sensors can optionally be at least two force sensors, where the at least two force sensors are arranged in a second direction with about equal spacing between each of the at least two force sensor and a respective peripheral edge of the touch surface. Optionally, the equal spacing between the respective peripheral edges of the touch surface can be maximized.

Alternatively or additionally, the device can further include a display device that is arranged between the device body and the touch surface. The plurality of force sensors can be arranged in an area between a peripheral edge of the display device and the bonded region.

Alternatively or additionally, the device can further include a processor and a memory operably coupled to the processor. The memory can have computer-executable instructions stored thereon that, when executed by the processor, cause the processor to apply a correction scalar from a three-dimensional normalization matrix to a force applied to the touch surface and measured by the plurality of force sensors. The three-dimensional normalization matrix can correct the non-linear force response of the plurality of force sensors.

Alternatively or additionally, the device can further include a capacitive touch sensor configured to obtain a location of the force applied to the touch surface. The memory can have further computer-executable instructions stored thereon that, when executed by the processor, cause the processor to receive the location of the force applied to the touch surface and apply the correction scalar from the three-dimensional normalization matrix based on the location of the force applied to the touch surface.

An example method for correcting non-linear force response of a force-sensitive electronic device is described herein. The method can include measuring a force applied to a touch surface of the force-sensitive electronic device, obtaining a location of the force applied to the touch surface, and applying a correction scalar from a three-dimensional normalization matrix to the measured force applied to the touch surface based on the location of the force applied to the touch surface. The three-dimensional normalization matrix can correct the non-linear force response of the at least one force sensor. In addition, the applied force can be measured using at least one force sensor, and the location of the applied force can be obtained using a capacitive touch sensor.

Another example force-sensitive electronic device is described herein. The device can include a circuit board bonded to a touch surface or a device body, a force sensor bonded to the circuit board, and a force sensor actuator bonded to the circuit board. The circuit board can include a location feature for aligning the force sensor actuator with the force sensor. For example, the location feature can optionally be a marking on a surface of the circuit board. Alternatively or additionally, the location feature can optionally be a raised or recessed portion on a surface of the circuit board. The force sensor actuator can be bonded to the circuit board with adhesive. Alternatively or additionally, the force sensor actuator can be soldered to the circuit board.

Alternatively or additionally, the force sensor actuator can be configured to apply a preload force to the force sensor. For example, the force sensor actuator can apply the preload force to the force sensor when the touch surface is bonded to the device body.

Alternatively or additionally, the circuit board can include circuitry configured to electrically connect to the force sensor.

An example method for manufacturing a force-sensitive electronic device is described herein. The method can include bonding a circuit board to a touch surface or device body, bonding a force sensor to the circuit board, aligning a force sensor actuator with the force sensor using a location feature of the circuit board, and bonding the force sensor actuator to the circuit board in alignment with the force sensor.

Additionally, the method can further include bonding the touch surface to the device body. This can cause a preload force to be applied to the force sensor.

It should be understood that the above-described subject matter (e.g., correcting the non-linear force response of a force-sensitive electronic device) may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIGS. 3A and 3B illustrate the touch surface and device body of the example force-sensitive electronic device of FIG. 1 bonded with different materials.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Figure 1:
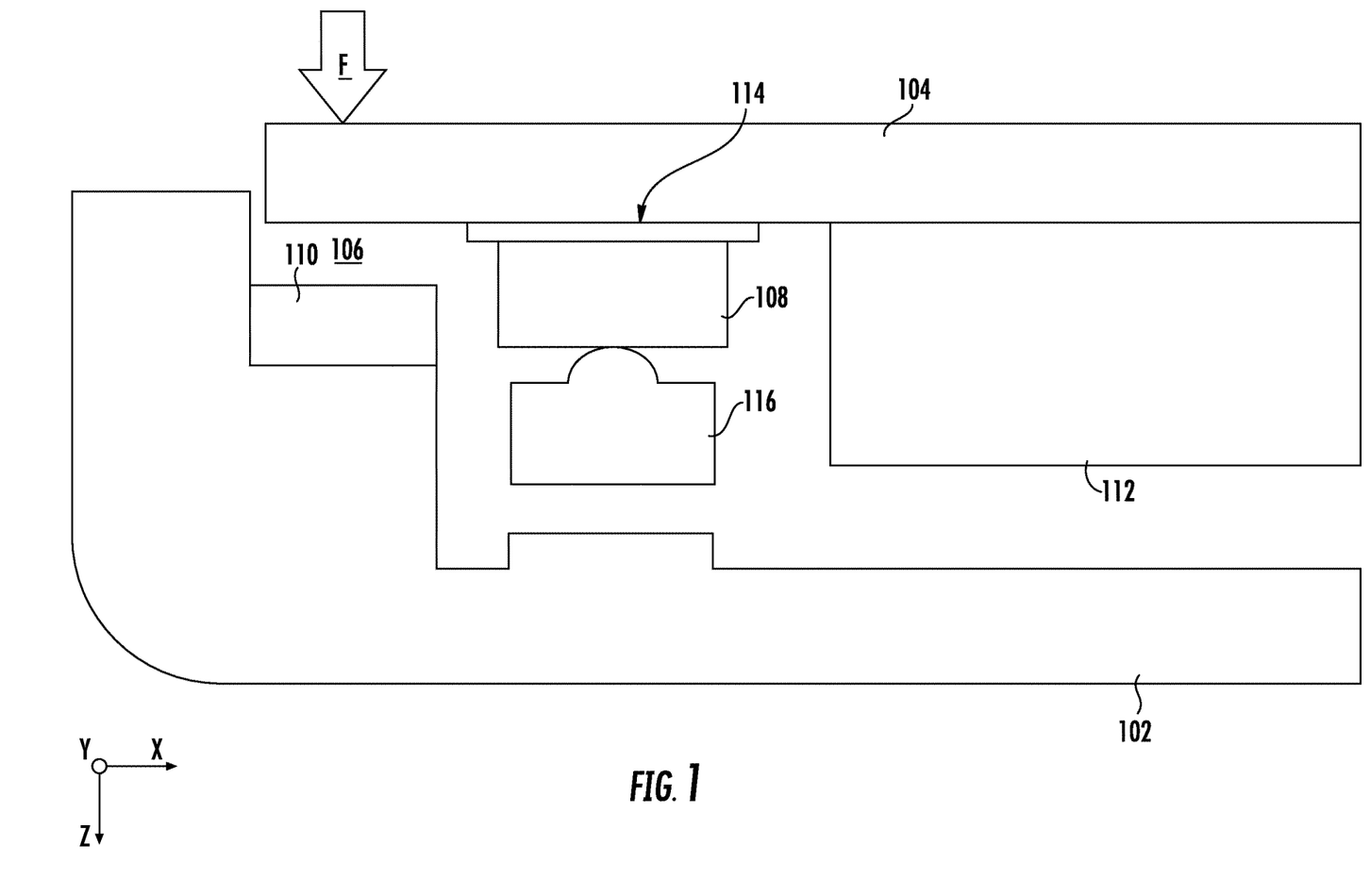
FIG. 1 is a cross section view of a portion of an example force-sensitive electronic device according to implementations described herein.

Referring now to FIG. 1, an example force-sensitive electronic device (also sometimes referred to herein as a touch-sensitive device) is described. The force-sensitive electronic device may be an electronic device having a force-sensitive human machine interface ("HMI"). Optionally, the force-sensitive electronic device can be a consumer electronic device such as a laptop computer, tablet computer, mobile phone, or other consumer electronic device, for example. It should be understood, however, that these are provided only as examples and that this disclosure contemplates that the force-sensitive electronic device can be any type of electronic device.

The device can include a device body 102, a touch surface 104 bonded to the device body 102 in a bonded region 106, and a plurality of force sensors 108 that are arranged between the device body 102 and the touch surface 104. Each of the force sensors 108 can be a piezoresistive, piezoelectric or capacitive sensor. For example, each of the force sensors 108 can be configured to change at least one electrical characteristic (e.g., resistance, charge, capacitance, etc.) based on an amount or magnitude of an applied force and can output a signal proportional to the amount or magnitude of the applied force. Alternatively or additionally, each of the force sensors 108 can be a microelectromechanical ("MEMS") sensor. For example, each of the force sensors 108 can optionally be a MEMS sensor as described in U.S. Pat. No. 9,487,388, issued Nov. 8, 2016 and entitled "Ruggedized MEMS Force Die," U.S. Pat. No. 9,493,342, issued Nov. 15, 2016 and entitled "Wafer Level MEMS Force Dies," U.S. Patent Application Publication No. 2016/0332866 to Brosh et al., filed Jan. 13, 2015 and entitled "Miniaturized and ruggedized wafer level mems force sensors," or U.S. Pat. No. 9,032,818, issued May 19, 2015 and entitled "Microelectromechanical Load Sensor and Method of Manufacturing the Same," the disclosures of which are incorporated by reference in their entireties.

Figure 2:
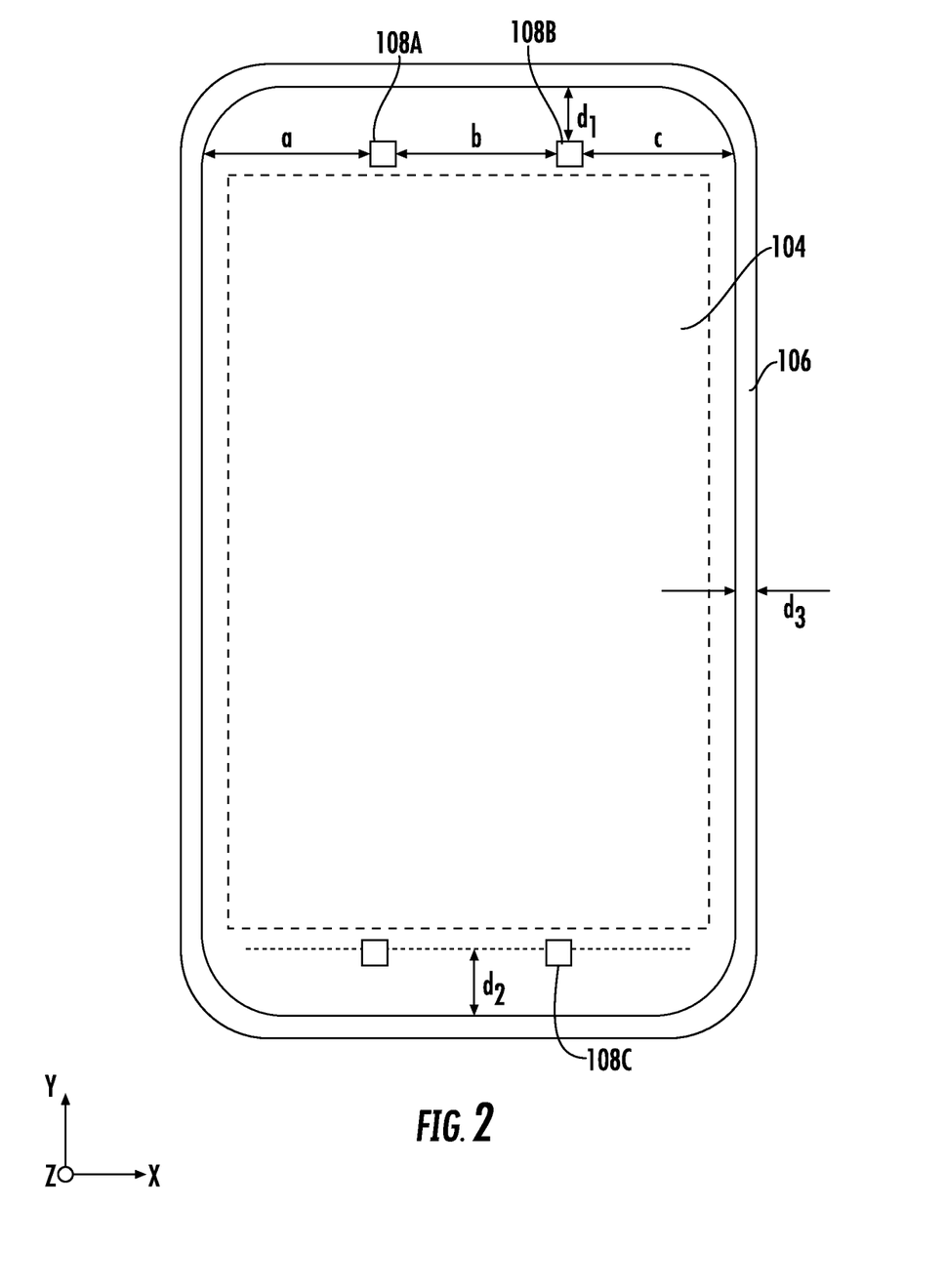
FIG. 2 illustrates an example arrangement of force sensors in the example force-sensitive electronic device of FIG. 1.
Figure 3A:
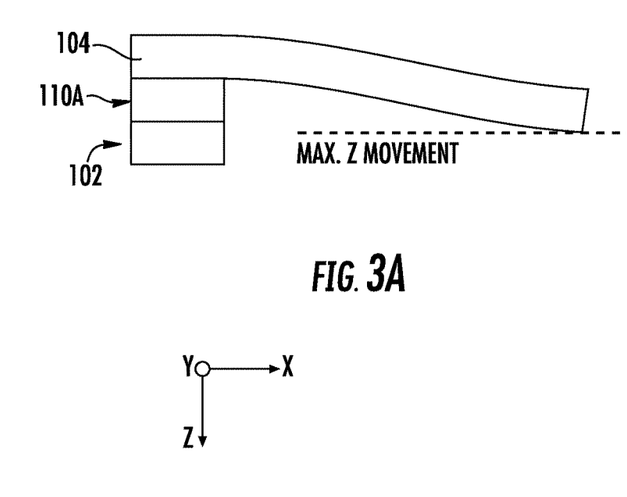
FIG. 3A illustrate bonding with a hard adhesive.
Figure 3B:
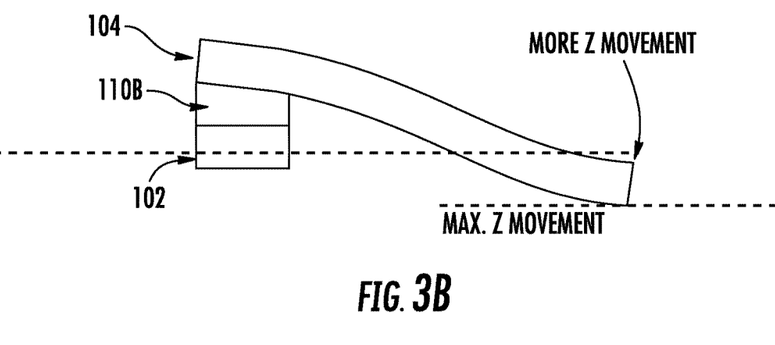
FIG. 3B illustrates bonding with a foam tape adhesive.

The bonded region 106 can be arranged along a peripheral edge of the touch surface 104 as shown in FIG. 2. The bonded region 106 is the region or area where a portion of the touch surface 104 makes contact with a portion of the device body 102. The bonded region 106 can at least partially surround a display region, which is illustrated by the dashed box in FIG. 2. In other words, the bonded region 106 is arranged in a peripheral region of the device while the display region is arranged in a central region of the device. Referring again to FIG. 1, the touch surface 104 can be bonded to the device body 102 using an adhesive 110. The adhesive 110 can be arranged between the portion of the touch surface 104 that makes contact with the portion of the device body 102. It should be understood that the adhesive 110 fixes the touch surface 104 relative to the device body 102. Thus, as shown in FIG. 1, the touch surface 104 is not free floating with respect to the device body 102. As described below, it is difficult to obtain accurate force measurements in proximity to the bonded region 106 since the touch surface 104 is fixed relative to the device body 102 in this area. The adhesive 110 can optionally be a pressure sensitive adhesive (PSA), epoxy, or other structural adhesive. Optionally, the adhesive 110 can be foam tape, which allows the touch surface 104 to experience an increased range of motion in the z-direction or axis as shown in FIGS. 3A and 3B. In FIG. 3A, the touch surface 104 is bonded to the device body 102 using a hard adhesive 110A, which hardens when cured and locks the edge of the touch surface 104. In FIG. 3B, the touch surface 104 is bonded to the device body 102 using a foam tape adhesive 110B, which is more flexible than adhesive 110A and allows the edge of the touch surface 104 to move.

In a conventional touch-sensitive device, it would typically be preferable to arrange force sensors near the periphery of the touch surface, for example, to maximize the touch area, and to also provide a touch surface that is free floating with respect to the device body. In other words, some freedom of motion between the touch surface and the device body is helpful to obtain accurate force measurements. This design, however, is incompatible with other design considerations for conventional touch-sensitive electronic devices. In particular, the touch surface is bonded to the device body in conventional touch-sensitive devices. However, arranging force sensors in proximity to a bond results in attenuated force measurements, which makes accurate force measurement difficult. Referring again to FIG. 2, an example arrangement of force sensors 108 in a device where the touch surface 104 is bonded to the device body 102 is described. As noted above, arranging force sensors 108 in proximity to the bonded region 106 results in undesirable effects on force measurements. To reduce undesirable effects, each of the plurality of force sensors 108 is spaced apart from the bonded region 106 in FIG. 2. In other words, there is a space between the bonded region 106 and the force sensors 108. The force sensors 108 are not arranged within, or in proximity to, the bonded region 106 where the portion of the touch surface 104 makes contact with the portion of the device body 102. Instead, the force sensors 108 are arranged inwardly (e.g., towards the center or display region) with respect to and spaced away from the bonded region 106. The example force-sensitive electronic device in FIG. 2 is substantially rectangular such that the touch surface 104 has two pairs of respective peripheral edges (e.g., left/right peripheral edges and top/bottom peripheral edges). As used herein, the respective peripheral edges are opposite to each other. It should be understood that the force-sensitive device shown in FIG. 2 is provided only as an example and that the force-sensitive device may have other shapes. Two force sensors 108A and 108B can be arranged along the x-direction or axis (also referred to herein as a "first direction") with about equal spacing between each other. Additionally, two force sensors 108A and 108B can be arranged along the x-direction with about equal spacing between each of the force sensors 108A, 108B and a respective peripheral edge of the touch surface 104. In FIG. 2, the x-axis is parallel to the peripheral edges of the force-sensitive electronic device with the smaller dimension. The force sensors 108 are equally spaced from each other along the x-axis. Additionally, the peripheral edges are equally spaced from a force sensor 108 along the x-axis. This is shown by distances "a", "b", and "c" in FIG. 2. For example, when the force sensors 108A and 108B are about equally spaced from each other and respective peripheral edges of the touch surface 104, distance a≈distance b≈distance c. In other words, distance "a" between one peripheral edge of the touch surface 104 (e.g., the left edge in FIG. 2) and force sensor 108A is about equal to distance "b" between force sensors 108A and 108B. Distance "a" is also about equal to distance "c" between the opposite peripheral edge of the touch surface 104 (e.g., the right edge in FIG. 2) and force sensor 108B. This disclosure contemplates that the distance between force sensors 108 and/or between a force sensor 108 and a peripheral edge can be selected to provide for adequate force transfer to the force sensors 108. This disclosure also contemplates that the distances can vary depending on the size of the force-sensitive electronic device, the number of force sensors, and/or the desired force sensing resolution. In some implementations, distances "a", "b", and "c" can be on the order of 20 millimeters (mm). It should be understood that 20 mm is provided only as an example dimension for distances "a", "b", and "c", which can have dimensions more or less than 20 mm. It should also be understood that distances "a", "b", and "c" need not necessarily be equal to achieve adequate force transfer.

Alternatively or additionally, two force sensors 108B and 108C can be arranged along the y-direction or axis (also referred to herein as a "second direction") with about equal spacing between each of the force sensors 108B, 108C and a respective peripheral edge of the touch surface 104. In FIG. 2, the y-axis is parallel to the peripheral edges of the force-sensitive electronic device with the larger dimension. Each of the force sensors 108 is equally spaced from a peripheral edge along the y-axis, and the distance from the peripheral edges is maximized. This is shown by distances "$d_1$" and "$d_2$" in FIG. 2. For example, when the force sensors 108B and 108C are about equally spaced from respective peripheral edges of the touch surface 104, distance $d_1$ distance $d_2$. In other words, distance "$d_1$" between one peripheral edge of the touch surface 104 (e.g., the top edge in FIG. 2) and force sensor 108B is about equal to distance "$d_2$" between the opposite peripheral edge of the touch surface 104 (e.g., the bottom edge in FIG. 2) and force sensor 108C. Optionally, the equal spacing between the respective peripheral edges of the touch surface 104 and each of force sensors 108B and 108C can be maximized such that the force sensors 108B and 108C are arranged as far from the bonded region 106 as possible. It should be understood that the number and arrangement of force sensors shown in the figures is provided only as an example and that other numbers of force sensors, as well as different arrangements, can be used. For example, a force-sensitive electronic device can include 1, 2, 3, 4, 5, etc. force sensors and can be arranged according to the description provided herein. In addition, the width of the bonded region 106, which is shown as distance $d_3$, can be minimized. Minimizing distance $d_3$ allows for maximization of distance $d_1$ and $d_2$ as described herein, with the understanding that the effect of minimizing distance $d_3$ on device durability can also be considered. The width of the bonded region, $d_3$, can be about 2-4 mm. Distances $d_1$ and $d_2$, in this example, can be maximized as much as space allows to provide adequate force transfer, which can be achieved with values of $d_1$ and $d_2$ equal to or greater than 4 mm. It should be understood that 2-4 mm is provided only as an example and that the width of the bonded region, $d_3$, can be more than 4 mm or less than 2 mm. Additionally, the values of $d_1$ and $d_2$ are provided only as examples and can depend on the value of $d_3$. This disclosure contemplates that the distance between a force sensor 108 and a peripheral edge can be selected to provide for adequate force transfer to the force sensors 108. This disclosure also contemplates that the distances can vary depending on the size of the force-sensitive electronic device, the number of force sensors, and/or the desired force sensing resolution.

Referring again to FIG. 1, the device can further include a display device 112 that is arranged between the device body 102 and the touch surface 104. The display device 112 can be a liquid crystal display (LCD), a light emitting diode (LED) display, an organic LED (OLED) display or other type of display. The bonded region 106 can be arranged at least partially around a perimeter of the display region (e.g., around a perimeter of the display device 112) as shown in FIG. 2. For example, the bonded region 106 can be arranged in a closed loop around the perimeter of the display region as shown in FIG. 2. As shown in FIG. 1, the plurality of force sensors 108 can be arranged in an area between a peripheral edge of the display device 112 and the bonded region 106 in some implementations. By arranging the force sensors 108 in this area, it is possible for no additional height to be added to the device, which minimizes the total thickness of the device in the z-direction. Current advancements in mobile phone technology, for example, are reducing the size of bezels, leaving less room between a bond (e.g., bonded region 106 in FIG. 1) and the display (e.g., display 112 in FIG. 1) for electrical components. This disclosure therefore contemplates that force sensors (e.g., force sensors 108 in FIG. 1) can optionally be placed under the display to minimize their impact on component areas and allow more placement flexibility. For example, in other implementations, one or more force sensors can optionally be sandwiched between the device body 102 and the display 112 in FIG. 1.

Figure 4:
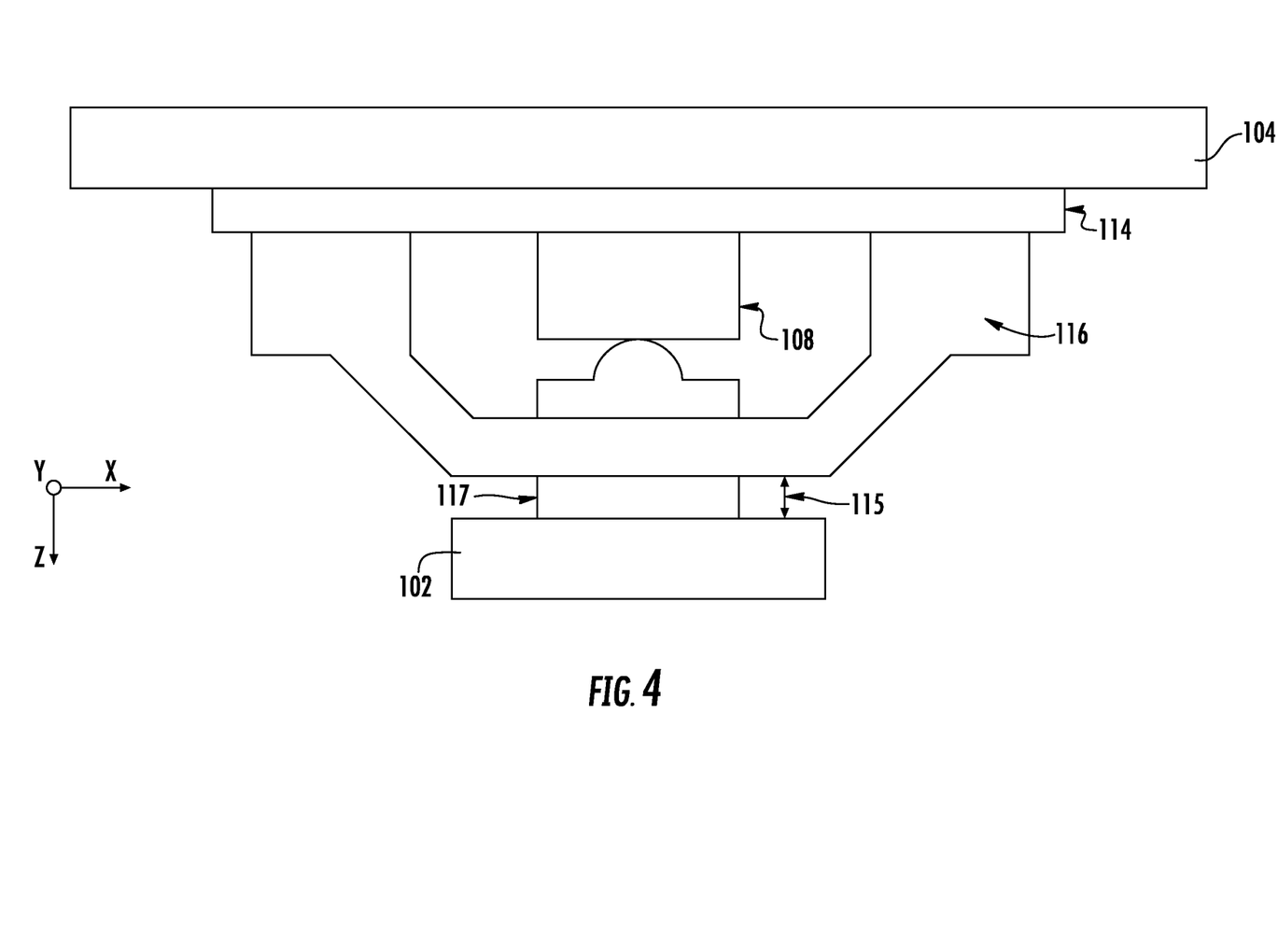
FIG. 4 illustrates a force sensor actuator incorporated into an example force-sensitive electronic device according to implementations described herein.
Figure 5A:
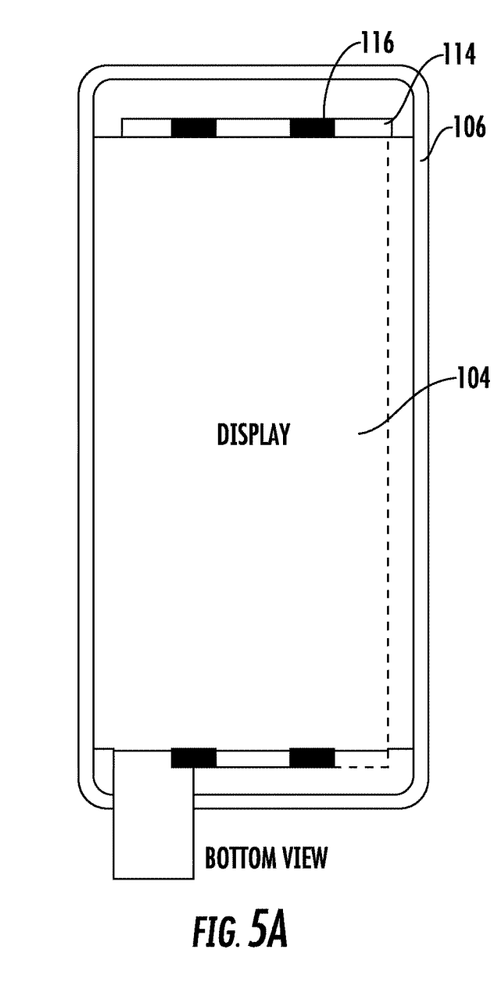
FIGS. 5A and 5B illustrate a circuit board bonded to a touch screen and a device body of an example force-sensitive electronic device, respectively, according to implementations described herein.
Figure 5B:
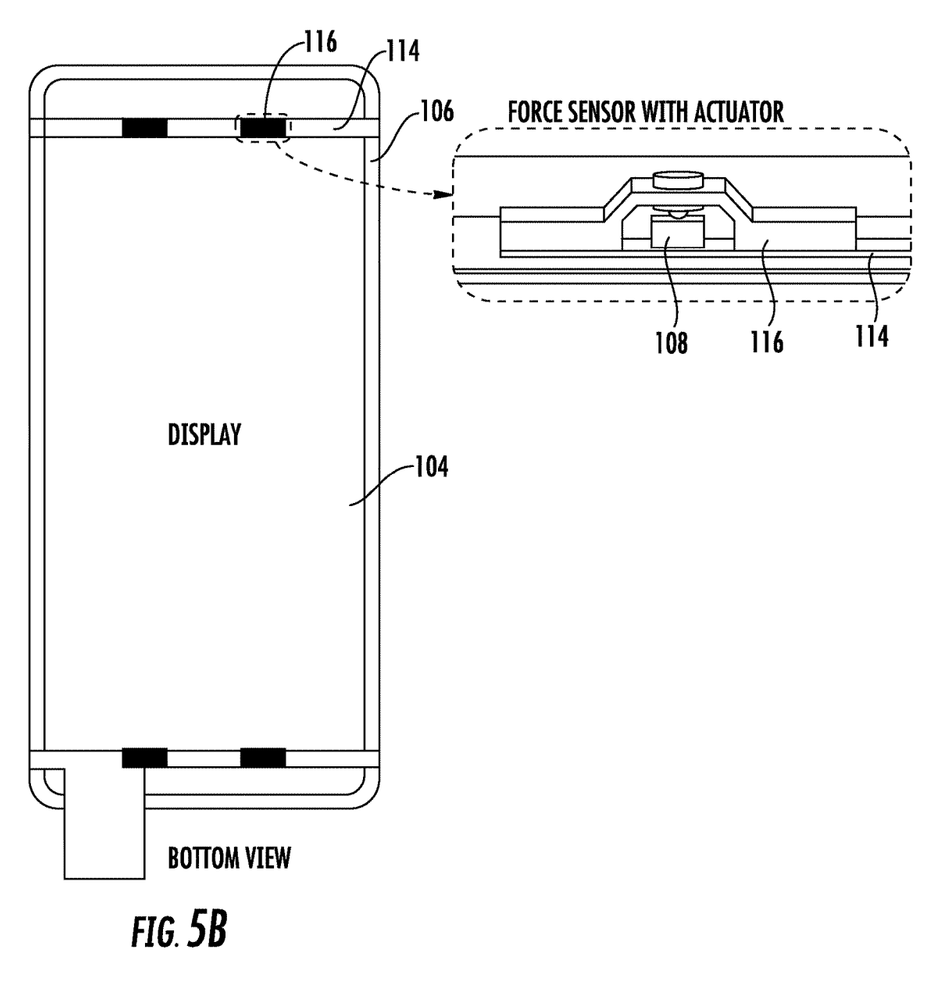

Referring now to FIGS. 4-7B, an example force-sensitive electronic device incorporating a force sensor actuator is described. The force-sensitive electronic device of FIGS. 4A-7A has many features in common with the device of FIG. 1, and the common features are therefore not described in further detail below. The device can include a circuit board 114 bonded to the touch surface 104, the force sensor 108 bonded to the circuit board 114, and a force sensor actuator 116 bonded to the circuit board 114. The circuit board 114, force sensor 108, and/or force sensor actuator 116 can be bonded using an adhesive such as a PSA, DSA, or other structural adhesive. Additionally, the circuit board 114 can be any circuit substrate configured to electrically connect the force sensors to a processor. For example, the circuit board 114 can optionally be a rigid or flexible printed circuit board (PCB). Optionally, the circuit board 114 can be a flexible PCB (FPCB). Further, the force sensor actuator 116 can be formed of various materials such as rubber or polymer (e.g., urethane, polyurethane, silicone, etc.). Although the FIG. 4 show the circuit board 114 bonded to the touch surface 104, it should be understood that the circuit board 114 can be bonded to the device body 102 in some alternative implementations. For example, FIG. 5A illustrates the circuit board 114 bonded to the touch surface 104 of the device. This is in contrast to FIG. 5B, which illustrates the circuit board 114 bonded to the device body 102 of the device.

Figure 6:
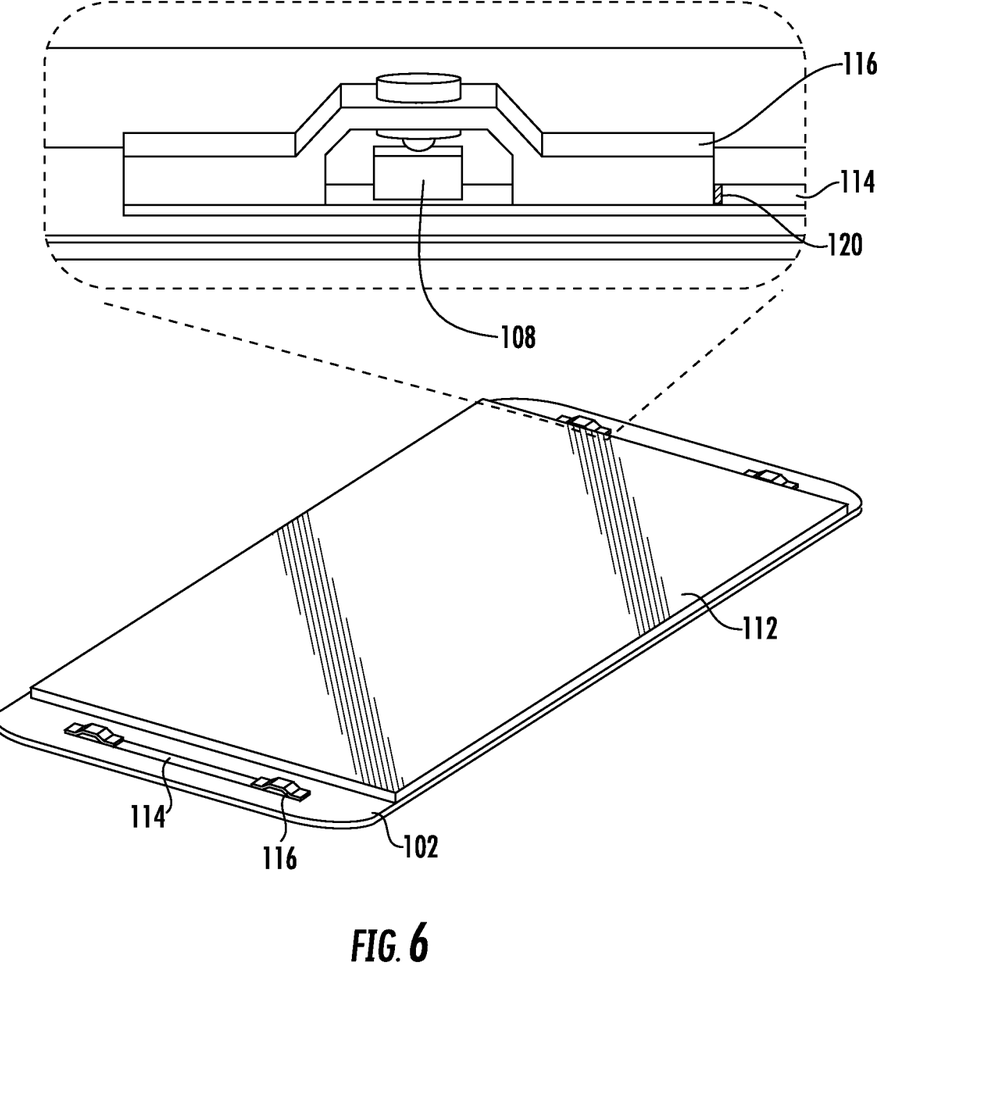
FIG. 6 illustrates a location feature of a circuit board of an example force-sensitive electronic device according to implementations described herein.

Referring now to FIG. 6, the circuit board 114 can include one or more location features 120 for aligning the force sensor actuator 116 with the force sensor 108. For example, the location feature 120 can optionally be a marking on a surface of the circuit board 114. Alternatively or additionally, the location feature 120 can optionally be a raised or recessed portion on a surface of the circuit board 114. The location feature 120 can be used for mechanically aligning the force sensor actuator 116 and the force sensor 108 during the manufacturing process. Due to the relatively small size of the force sensor 108 and manufacturing tolerances, it can be difficult to align the force sensor with a force application feature of the device body. Thus, by providing a location feature on the circuit board 114, this difficulty can be overcome.

Figure 7A:
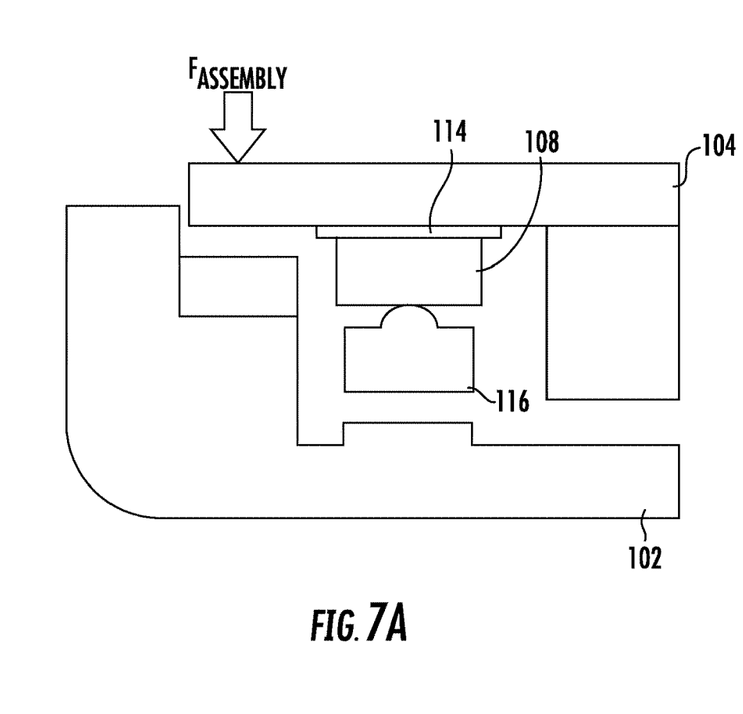
FIGS. 7A and 7B illustrate an example force-sensitive electronic device before (FIG. 7A) and after (FIG. 7B) bonding the touch surface and the device body according to implementations described herein.
Figure 7B:
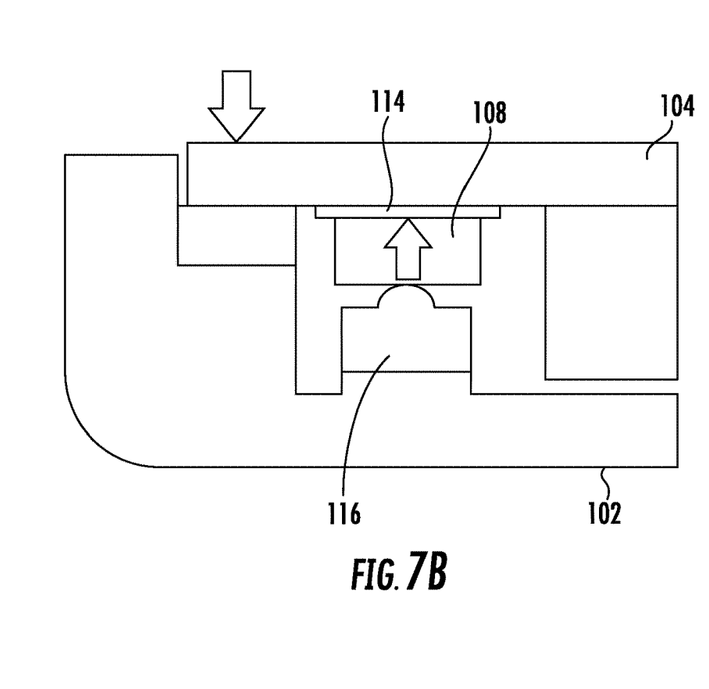

Referring again to FIG. 4, the force sensor actuator 116 can be configured to apply a preload force to the force sensor 108. For example, the force sensor actuator 116 can apply the preload force to the force sensor 108 when the touch surface 104 is bonded to the device body 102. The force sensor actuator 116 can compress and preload the force sensor 108. FIGS. 7A and 7B illustrate an example force-sensitive electronic device before (FIG. 7A) and after (FIG. 7B) bonding the touch surface 104 and the device body 102. As shown in FIG. 4, a clearance 115 can be provided between the force sensor actuator 116 and the device body 102. The clearance 115 can account for manufacturing and assembly tolerances. Additionally, a deformation layer 117 between the force sensor actuator 116 and the device body 102 can form a deformation zone. The deformation layer 117 can be configured to deform in the z-direction and apply the preload force to the force sensor 108 when the touch surface 104 is bonded to the device body 102. The preload force can be designed to not exceed a predetermined percentage of a force sensing range of a force sensor such as 20% (e.g., 2N for a force sensor with a 10N range). Alternatively or additionally, the preload force can have a predetermined tolerance such as +/−20% (e.g., 1.6N-2.4N for a 2N preload force). It should be understood that the predetermined percentage and/or the predetermined tolerance can have values other than those provided above, which are used only as examples. Optionally, the force sensor actuator 116 can include a portion (e.g., a raised portion) for distributing the applied force to the force sensor 108. Techniques for reducing moments and/or shear forces applied to force sensors are known in the art. For example, U.S. Pat. No. 7,190,350 to Roberts, filed Apr. 12, 2002 and entitled "Touch screen with rotationally isolated force sensor," describes a rotationally isolated force sensor.

Figure 8:
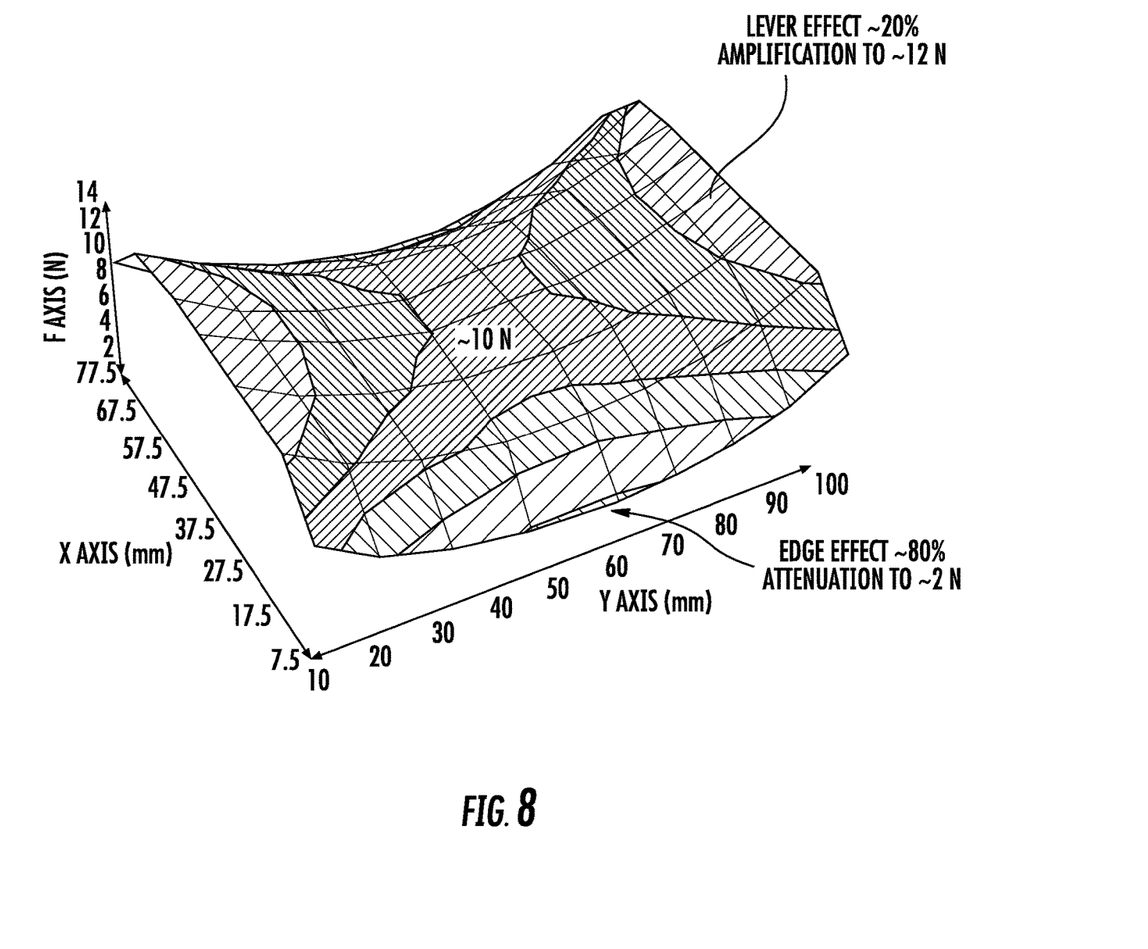
FIG. 8 illustrates amplification and attenuation of force measurements obtained by force sensors arranged as described with respect to FIG. 2.

As noted above, arranging force sensors in proximity to a bond results in amplified and/or attenuated force measurements. This can make accurate force measurements difficult. Referring now to FIG. 8, amplification and attenuation of force measurements are described. These effects occur with the arrangement of force sensors described with respect to FIG. 2. In some places, force measurements are amplified by about 20% (e.g., at opposite ends along the y-axis of the device). In other places, force measurements are attenuated by about 80%, and in some cases more than 80%, (e.g., at opposite ends along the x-axis of the device) due to edge effects. In contrast, force measurements in the center of the device are accurate. Accordingly, the force response of the device is non-linear.

In order to correct the non-linear response, a correction scalar from a three-dimensional normalization matrix (e.g., the "normalization matrix" shown in FIG. 9) can be applied to a force measured by the plurality of force sensors (e.g., force sensors 108 as described herein). The three-dimensional normalization matrix can correct the non-linear force response of the plurality of force sensors based on the touch location (X, Y) and the uncompensated force (F'), as long as the touch location is known based on another touch sensor. For example, the device can further include a capacitive touch sensor such as a projected capacitive touchscreen for obtaining the location of the applied force.

In a projected capacitive touchscreen, an insulator (e.g., glass) is provided with a conductive material coated thereon. The conductive material can be a conductive layer, grid (e.g., rows and columns), array, etc. Optionally, the conductive material can be transparent such as indium tin oxide ("ITO"). A voltage can be applied to the conductive material to generate an electrostatic field. Then, when a conductor (e.g., a human finger) contacts the display, the local electrostatic field is distorted. It is possible to detect/measure this local distortion as a change in capacitance and determine one or more touch locations or positions (e.g., x- and y-positions) on the display. Projected capacitive touchscreens are known in the art and therefore not described in further detail herein.

Figure 9:
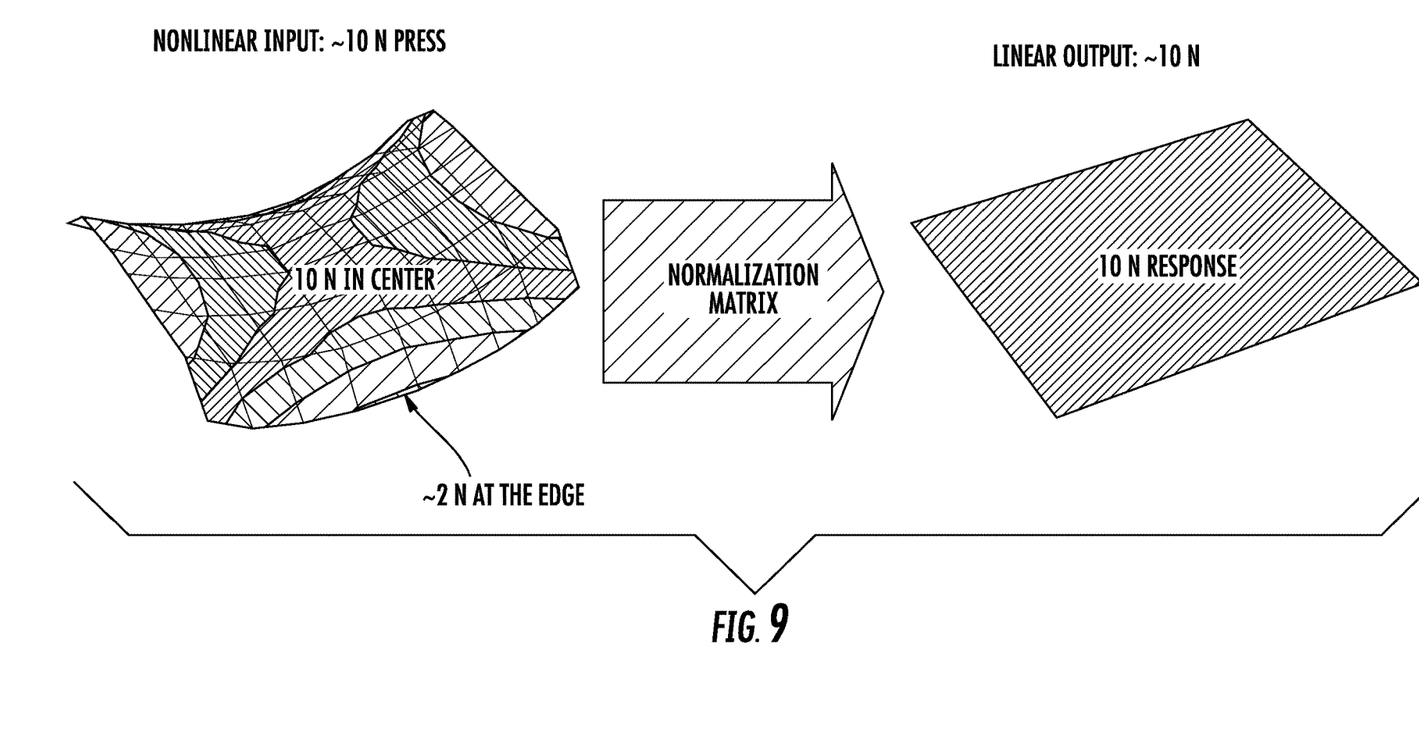
FIG. 9 illustrates using a polynomial response surface transform to correct the non-linear force response measurements shown in FIG. 8.

Using the location and uncompensated magnitude of the applied force, the correction scalar from a three-dimensional normalization matrix can be applied to the measured force applied to the touch surface based on the location of the force applied to the touch surface. For example, the three-dimensional normalization matrix can have axes corresponding to x-location, y-location (sometimes referred to herein as "location plane of the touch surface"), and force, so that any nonlinearities in the force at a fixed position can be corrected accurately. The three-dimensional normalization matrix can have a plurality of nodes or points in the x, y plane and a plurality of force levels. An example correction matrix for a mobile phone may have 96 points in the x, y plane and 3-5 force levels. It should be understood that the number of points in the x, y plane and/or the number of force levels is not intended to be limited by this disclosure. The plurality of points can be spread over the x, y plane. This disclosure contemplates that the points can be spaced evenly or unevenly over the x, y plane. Additionally, a different correction scalar can be applied at the same point depending on magnitude of the applied force. For example, in some implementations, the three-dimensional normalization matrix can have three force levels. When applied force is less than a first threshold, a first correction scalar can be applied to correct the uncompensated force. When applied force is greater than the first threshold but less than a second threshold, a second correction scalar can be applied to correct the uncompensated force. When force is greater than the second threshold, a third correction scalar can be applied to correct the uncompensated force. If force is applied between matrix nodes or points, a correction scalar can be determined by linear interpolation or successive approximation of correction scalar values at a plurality of nearby matrix nodes or points. Accordingly, the non-linear force response can be corrected across the touchscreen at a range of forces. This correction is illustrated by FIG. 9.

It is typically not feasible to characterize every device on a production line with a dense calibration matrix. Such a calibration procedure can require more than a minute per device, which can increase testing costs for large volume products substantially. Therefore, for improved test times at large volumes, a small number of devices (e.g., a subset of the large volume of products) can be characterized with a dense matrix of points (e.g., points over the location plane of the touch surface) to be representative of the population (e.g., the large volume of products). It should be understood that the number of points in the dense matrix should not be limited by this disclosure. From these matrices for the subset of devices, a master matrix can be calculated by averaging each point in the matrix for all of the measured devices in the subset. The master matrix can then be applied to each device on the line without requiring calibration. For example, the master matrix can be used to adjust one or more scalar values of the three-dimensional normalization matrix described above for each device on the line. To improve accuracy, one or more (e.g., a smaller number of points as compared to the number of points in the master matrix) points can optionally be measured on each device to correct the master matrix before the master matrix is applied to a device. This can be done by weighting the master matrix points against the calibrated points based on distance from the calibration points. A number of known methods can be used to determine the optimum weighting to maximize accuracy, including linear and polynomial functions. It has been demonstrated that this test method can reduce calibration time significantly while achieving highly accurate force across the touch screen of a device.

The device can further include a processor and a memory operably coupled to the processor. The processor can be configured to apply the correction scalar from a three-dimensional normalization matrix as described herein. An example processor and memory are described with respect to the computing device of FIG. 10. The processor can be communicatively coupled to the force sensors, for example, via a circuit board (e.g., circuit board 114 as described herein). This disclosure contemplates the processor and force sensors can be communicatively coupled by any medium that facilitates data exchange between the processor and force sensors including, but not limited to, wired, wireless and optical links. The force applied to the touch surface (e.g., touch surface 104 as described herein) can be measured by the force sensors and received by the processor. Alternatively or additionally, the processor and capacitive touch sensor such as a projected capacitive touchscreen can be communicatively coupled, for example, by any medium that facilitates data exchange between the processor and capacitive touch sensor including, but not limited to, wired, wireless and optical links. The location of the applied force can be measured by the capacitive touch sensor and received by the processor.

It should be appreciated that the logical operations described herein with respect to the various figures may be implemented (1) as a sequence of computer implemented acts or program modules (i.e., software) running on a computing device (e.g., the computing device described in FIG. 10), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 10:
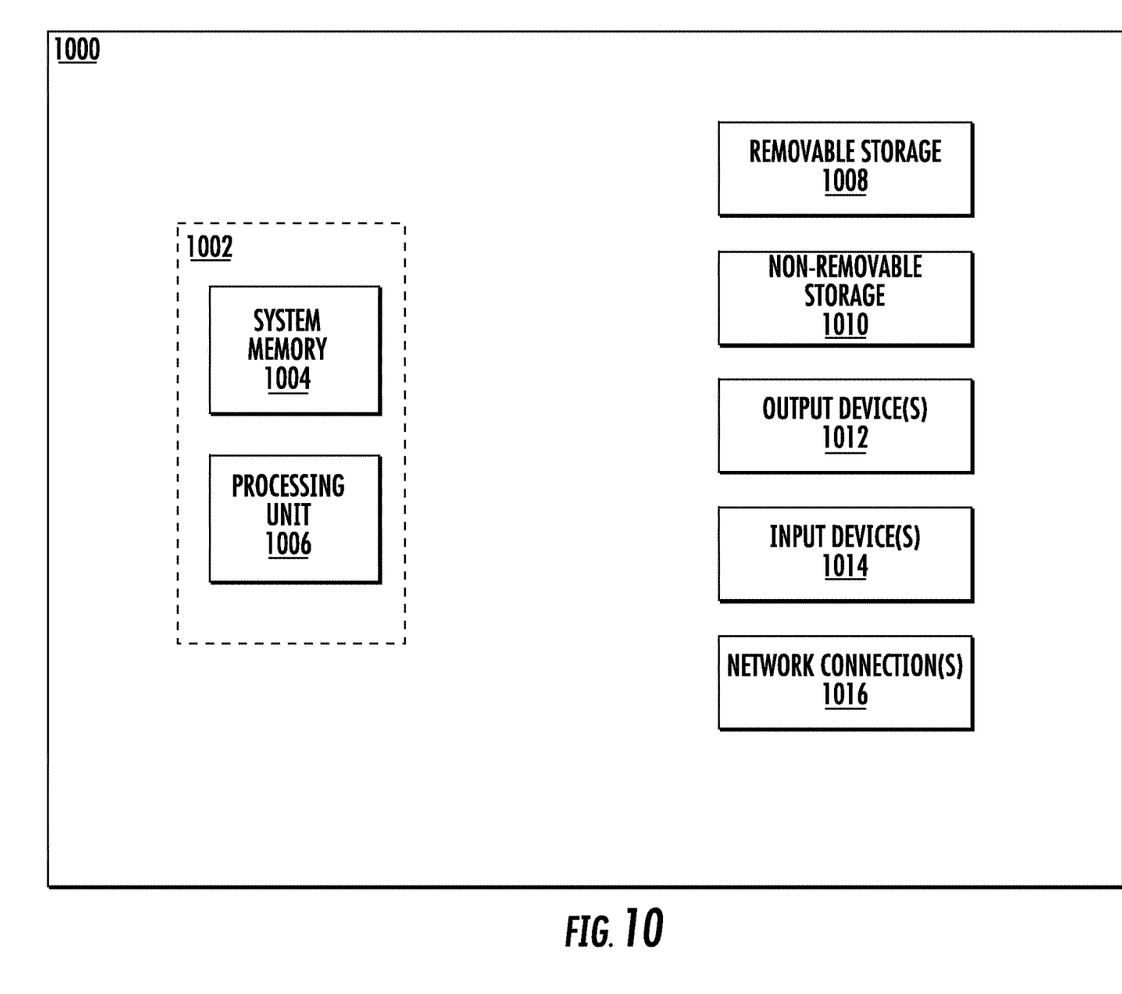
FIG. 10 illustrates an example computing device.

Referring to FIG. 10, an example computing device 1000 upon which embodiments of the invention may be implemented is illustrated. It should be understood that the example computing device 1000 is only one example of a suitable computing environment upon which embodiments of the invention may be implemented. Optionally, the computing device 1000 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 1000 typically includes at least one processing unit 1006 and system memory 1004. Depending on the exact configuration and type of computing device, system memory 1004 may be volatile (such as random access memory (RAM)), non-volatile (such as read-only memory (ROM), flash memory, etc.), or some combination of the two. This most basic configuration is illustrated in FIG. 10 by dashed line 1002. The processing unit 1006 may be a standard programmable processor that performs arithmetic and logic operations necessary for operation of the computing device 1000. The computing device 1000 may also include a bus or other communication mechanism for communicating information among various components of the computing device 1000.

Computing device 1000 may have additional features/functionality. For example, computing device 1000 may include additional storage such as removable storage 1008 and non-removable storage 1010 including, but not limited to, magnetic or optical disks or tapes. Computing device 1000 may also contain network connection(s) 1016 that allow the device to communicate with other devices. Computing device 1000 may also have input device(s) 1014 such as a keyboard, mouse, touch screen, etc. Output device(s) 1012 such as a display, speakers, printer, etc. may also be included. The additional devices may be connected to the bus in order to facilitate communication of data among the components of the computing device 1000. All these devices are well known in the art and need not be discussed at length here.

The processing unit 1006 may be configured to execute program code encoded in tangible, computer-readable media. Tangible, computer-readable media refers to any media that is capable of providing data that causes the computing device 1000 (i.e., a machine) to operate in a particular fashion. Various computer-readable media may be utilized to provide instructions to the processing unit 1006 for execution. Example tangible, computer-readable media may include, but is not limited to, volatile media, non-volatile media, removable media and non-removable media implemented in any method or technology for storage of information such as computer readable instructions, data structures, program modules or other data. System memory 1004, removable storage 1008, and non-removable storage 1010 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 1006 may execute program code stored in the system memory 1004. For example, the bus may carry data to the system memory 1004, from which the processing unit 1006 receives and executes instructions. The data received by the system memory 1004 may optionally be stored on the removable storage 1008 or the non-removable storage 1010 before or after execution by the processing unit 1006.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for correcting a non-linear force response of a force-sensitive electronic device having a touch surface connected to the electronic device at a bonded region along a periphery of the touch surface and the touch surface defining a display region, within the touch surface, that does not overlap with the bonded region, the method comprising:
   placing a series of force sensors in a sequence, from a first force sensor to a last force sensor, within the electronic device and along a first axis extending in a first direction across the touch surface from a first peripheral edge proximate the first force sensor to a second peripheral edge proximate the last force sensor, the force sensors being positioned entirely within the display region of the touch surface;
   spacing the series of sensors with equal distances between the first peripheral edge and the first force sensor, between the second peripheral edge and the last force sensor, and between the force sensors in the series,
   assigning a respective set of multiple correction scalars to respective locations on the touch surface, each correction scalar in each set corresponding to at least one magnitude of a force applied at the respective location;
   measuring, using at least one force sensor, the force applied to the touch surface of the force-sensitive electronic device at one of the respective locations;
   obtaining, using a capacitive touch sensor, the respective location of the force applied to the touch surface; and
   selecting, from the set of selection scalars for the respective location, a correction scalar assigned to the magnitude of the force applied at the respective location of the force applied,
   applying the correction scalar to the measured force.

2. The method of claim 1, wherein the three-dimensional normalization matrix comprises a plurality of correction scalars for a plurality of points in a location plane of the touch surface.

3. The method of claim 2, wherein the three-dimensional normalization matrix further comprises a plurality of correction scalars for a plurality of force levels.

4. The method of claim 1, further comprising obtaining the correction scalar by look-up in the three-dimensional normalization matrix.

5. The method of claim 4, further comprising calculating the correction scalar by linear interpolation or successive approximation of correction scalars between points in the location plane of the touch surface.

6. A force-sensitive electronic device for correcting non-linear force response, comprising:
  a touch surface connected to the force-sensitive electronic device with a bonded region at a periphery of the touch surface, the touch surface defining a display region, within the touch surface, that does not overlap with the bonded region;
  a series of force sensors in a sequence, from a first force sensor to a last force sensor, within the electronic device and along a first axis extending in a first direction across the touch surface from a first peripheral edge proximate the first force sensor to a second peripheral edge proximate a second force sensor, the force sensors being positioned entirely within the display region of the touch surface, and wherein the series of sensors are spaced with equal distances between the first peripheral edge and the first force sensor, between the second peripheral edge and the last force sensor, and between the force sensors in the series;
  a capacitive touch and sensor configured for obtaining a respective location of a force applied to the touch surface;
  a processor and a memory operably coupled to the processor, wherein the memory has computer-executable instructions stored thereon that, when executed by the processor, cause the processor to:
    access a three-dimensional normalization matrix comprising a respective set of multiple correction scalars assigned to respective locations on the touch surface, each correction scalar in each set corresponding to at least one magnitude of a force applied at the respective location;
    receive a measurement of the magnitude of the force applied to the touch surface, wherein the force applied to the touch surface is measured using at least one of the force sensors;
    receive a location of the force applied to the touch surface, wherein the location of the force applied to the touch surface is obtained using the capacitive touch sensor; and
    selecting, from a set of selection scalars for the respective location, a correction scalar assigned to the magnitude of the force applied at the respective location of the force applied,
    applying the correction scalar to the measurement of the magnitude of the force.

7. The force-sensitive electronic device of claim 6, wherein the three-dimensional normalization matrix comprises a plurality of correction scalars for a plurality of points in a location plane of the touch surface.

8. The force-sensitive electronic device of claim 7, wherein the three-dimensional normalization matrix further comprises a plurality of correction scalars for a plurality of force levels.

9. The force-sensitive electronic device of claim 6, the memory having further computer-executable instructions stored thereon that, when executed by the processor, cause the processor to obtain the correction scalar by look-up in the three-dimensional normalization matrix.

10. The force-sensitive electronic device of claim 9, the memory having further computer-executable instructions stored thereon that, when executed by the processor, cause the processor to calculate the correction scalar by linear interpolation or successive approximation of correction scalars between points in the location plane of the touch surface.

11. The force sensitive electronic device of claim 1, further comprising:
  positioning an additional series of force sensors along a second axis extending in a second direction across the touch surface from a third peripheral edge proximate the first force sensor to a fourth peripheral edge proximate an end force sensor, the force sensors being positioned entirely within the display region of the touch surface, and
  spacing the additional series of sensors with equal distances between the third peripheral edge and the first force sensor, between the fourth peripheral edge and the end force sensor, and between the force sensors in the additional series.

* * * * *